(No Model.) 4 Sheets—Sheet 3.
J. ZENGEL.
MACHINE FOR MAKING FENCES.
No. 326,007. Patented Sept. 8, 1885.
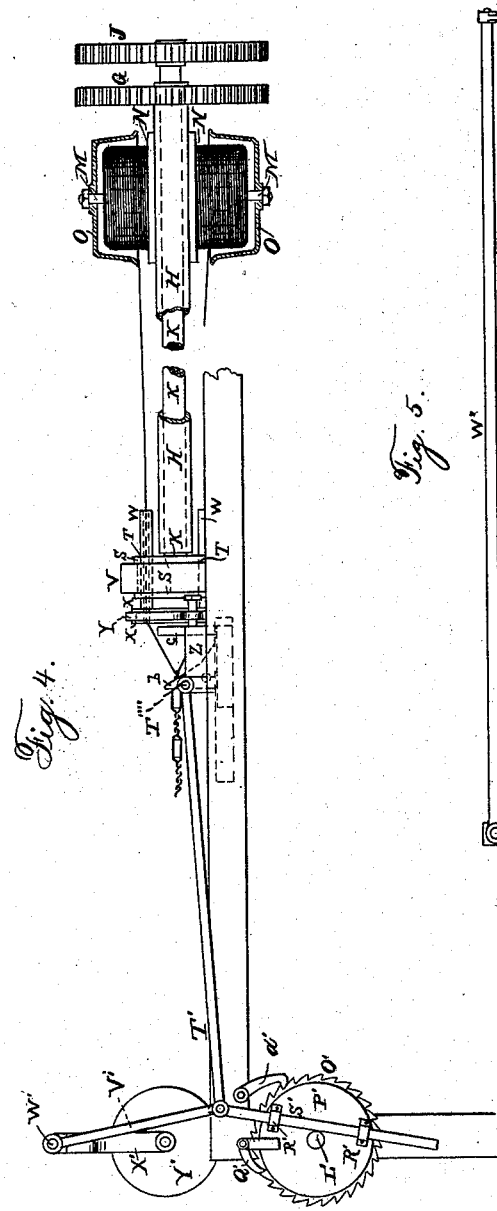
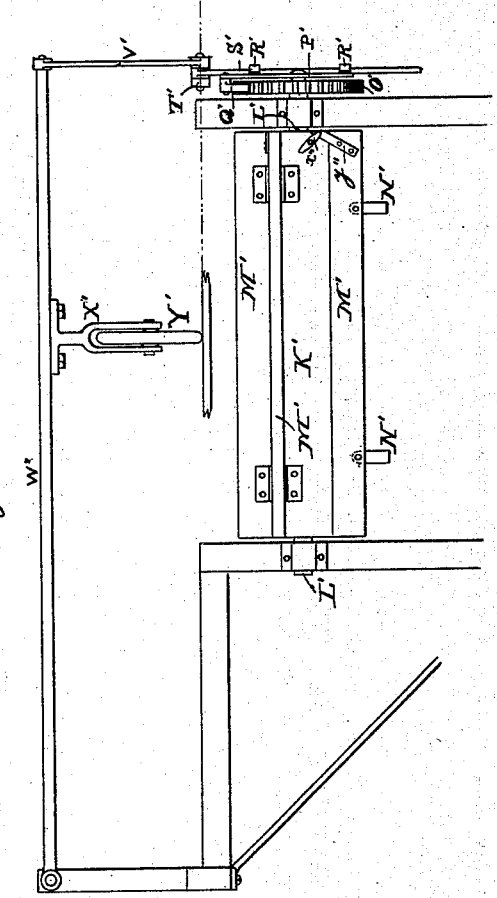
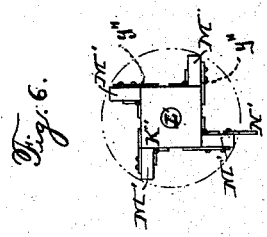
WITNESSES
William R. Ellison
E. B. Bell
INVENTOR
Joseph Zengel
BY Chas. C. Gill
ATTORNEY (No Model.) 4 Sheets—Sheet 4.

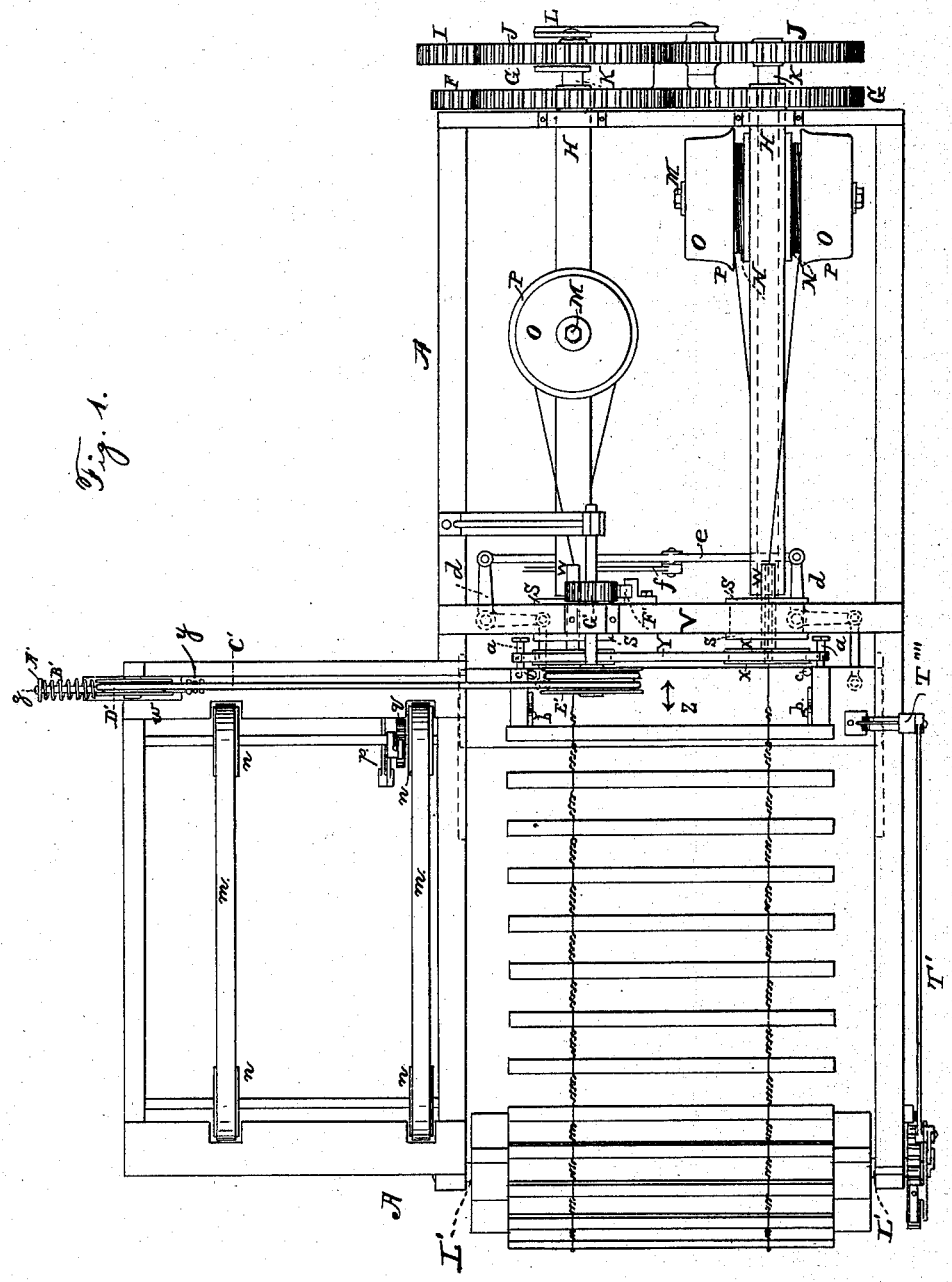

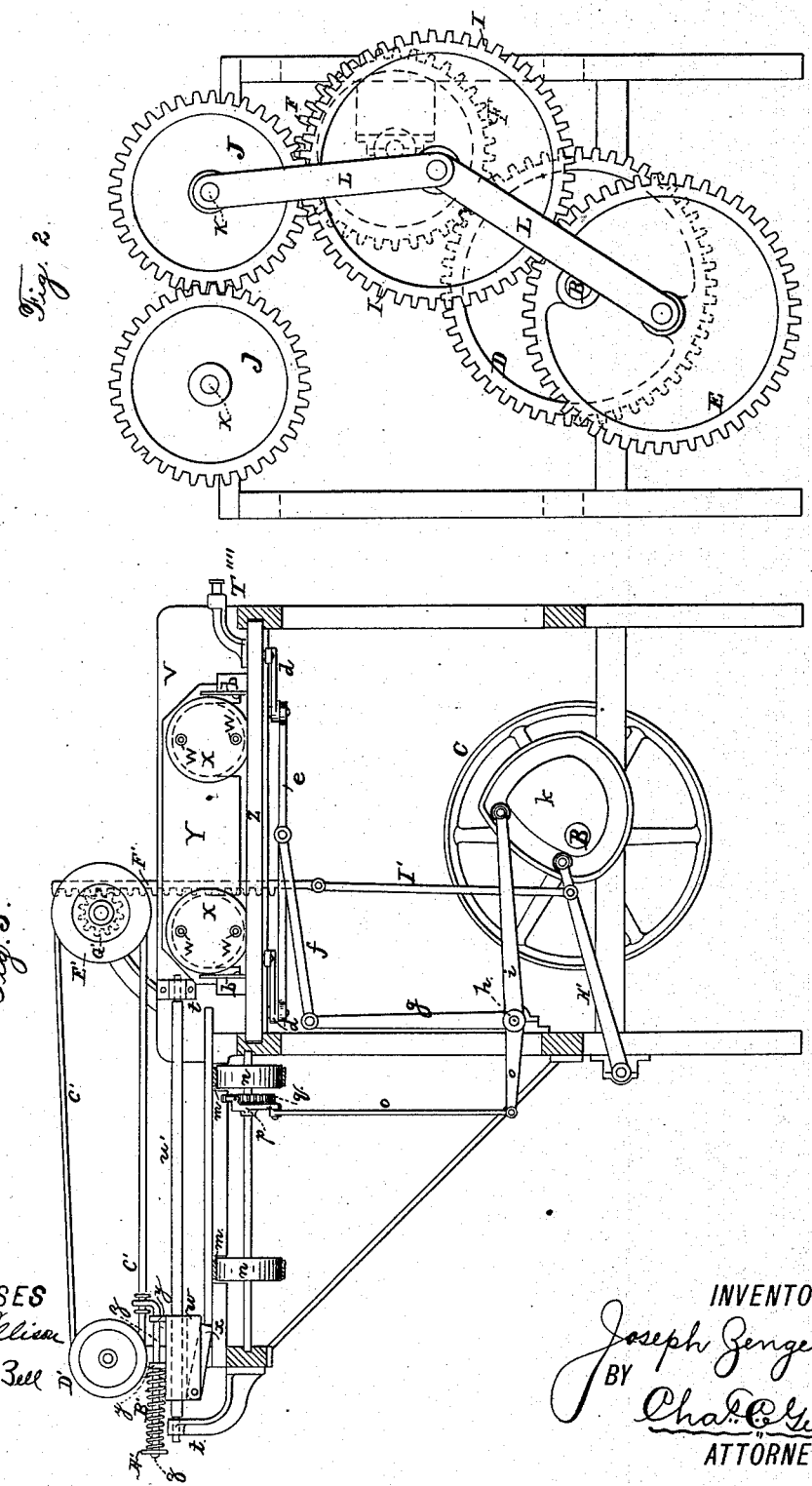

J. ZENGEL.
MACHINE FOR MAKING FENCES.

No. 326,007. Patented Sept. 8, 1885.

WITNESSES
Wm T. Gill.
I. N. Kalb

INVENTOR
Joseph Zengel
By Chas. C. Gill
ATTORNEY

UNITED STATES PATENT OFFICE.

JOSEPH ZENGEL, OF QUINCY, ILLINOIS.

MACHINE FOR MAKING FENCES.

SPECIFICATION forming part of Letters Patent No. 326,007, dated September 8, 1885.

Application filed August 13, 1884. (No model.)

*To all whom it may concern:*

Be it known that I, JOSEPH ZENGEL, a citizen of the United States, and a resident of Quincy, in the county of Adams and State of Illinois, have invented certain new and useful Improvements in Machines for Making Fences, of which the following is a specification.

The invention relates to an improvement in machines for making fences of the kind that is composed of wooden pickets secured by wire twisted about their upper and lower ends.

In connection with this application I refer to Letters Patent of the United States No. 289,490, granted to me on the 4th day of December, 1883, which Letters Patent illustrate some of the principles embodied in the apparatus which is the subject of this application.

The invention sought to be protected hereby will be fully understood from the detailed description hereinafter presented, reference being had to the accompanying drawings, in which—

Figure 7:
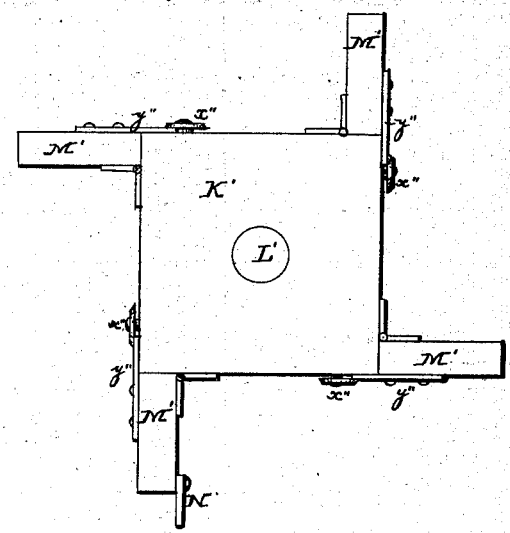
Figure 8:
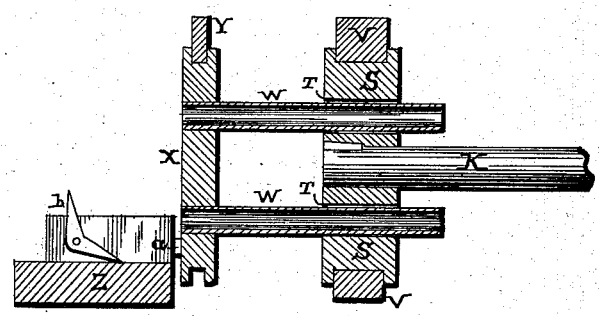

Figure 1 is a top view of a fence-making machine embodying the elements of the invention. Fig. 2 is a view looking at the rear end of same. Fig. 3 is a plan view partly in section looking at the front end of the machine. Fig. 4 is a detached view illustrating the reels of wire, the twister devices, and mechanism for operating the fence-reel. Fig. 5 is a front view of the fence-reeling apparatus. Fig. 6 is an end view of the reel K'. Fig. 7 is an enlarged end view of the reel K', and Fig. 8 is an enlarged central vertical longitudinal section through the twisters.

A denotes the frame of the machine; B, the main driving-shaft, and C a belt-wheel arranged thereon. Upon the outer end of the shaft B are secured the gear-wheel D and gear-wheel E, the latter being arranged eccentrically to the wheel D. The wheel D is in constant gear with the pinion F, which meshes with the gear-wheel G, secured upon the end of the reel-shaft H. The wheel G meshes with the similar gear-wheel on the end of the adjoining shaft H, in order that both shafts may have a simultaneous movement. The gear-wheel E meshes with the gear-wheel I, and this in turn meshes with the gear-wheel J, secured upon the axle K, inclosed in the reel-shaft H. The wheel J meshes with a similar wheel on the adjacent axle K, so that both axles will have a simultaneous movement. The wheel I is supported by means of the jointed arms L, which pass from the center of the wheel J and the wheel E and meet at the center of the wheel I.

The gearing above described is substantially similar to that illustrated in my said Letters Patent hereinbefore referred to, and its purpose is, as described in said Letters Patent, to produce a different motion in the axles K and reel-shafts H, the latter having a continuous rotary motion and the former an intermittent rotary motion.

Upon the reel-shafts H are secured upon the transverse axles M the reels N for the wire used in connecting the pickets to make the fence. The reels N are of usual construction, with the exception of the caps O, which are retained by the axles M, and have flaring sides P, which extend over the body of the reel, leaving a space, however, through which the wire may pass when drawn forward by the twisters, as hereinafter described. The purpose of the caps O is to prevent the wire from flying from the reels when the machine is in operation. It has some times occurred, owing to the rapidity with which the reel-shafts are operated, that the wire has been caused to move over the edges of the reel and become twisted and broken. To remedy this, without interfering with the usual operation of the machine, is the object accomplished by the caps O.

Upon the forward ends of the axles K are the enlarged hubs S, containing apertures T, the hubs being mounted in the cross-bar V. Each of the twisters for the strands of wire passing from the reels N consists of the axle K, the hub S, rigidly mounted on the front end thereof, the small tubes W, and disk X, the disk being forward of the hub and carrying said tubes, the rear portions of which are within apertures T, formed in the hub to receive them. The tubes W pass entirely through the disk X and have (with said disk) a longitudinal reciprocating movement during the operation of the machine. The disks X are connected by a suitable plate or yoke, Y, hereinafter mentioned, whereby they may have a simultaneous and corresponding reciprocating movement when actuated.

In front of the disks X is placed the movable fence-feeding carriage Z, which is adapted to slide longitudinally, and is connected with the plate or yoke Y by means of the pins $a$, which pass through the apertures in the plate and are headed upon the rear side thereof. The pins $a$ may move within the apertures formed in the plate Y without moving the twister-disks; but when, during the forward movement of the carriage Z, the head of the pins $a$ come in contact with the plate Y they draw the said plate and the twister-disks X and their tubes W forward. Upon the rearward movement of the carriage Z the pins $a$ will slide through their apertures in the plate Y until some portion of the carriage comes in contact with the plate, this having the effect of forcing the twister devices rearward to their former position.

The carriage Z is provided with pivoted dogs $b$ and vertical rods $c$, similar to the like devices described in my said patent hereinbefore referred to. The carriage Z is given its forward and backward movement for the well-known purpose of moving the fence forward as the pickets are inserted between the wires and there secured, and this movement is effected by means of the bell-crank levers $d$, located in proper relation to engage the ends of the carriage. The levers $d$ are also connected with the bar $e$, which is given a transverse movement through the medium of the levers $f$ $g$, the latter being connected with the shaft $h$, which is given a semi-rotary movement by means of the lever $i$, the forward end of which is provided with a friction-wheel and travels in the cam $k$. The cam $k$ is secured eccentrically upon the forward end of the shaft B, by which it is rotated. By securing the cam eccentrically upon the shaft B, and owing to the peculiar formation of the cam, there will be no movement of the levers $d$ and carriage Z when the end of the lever $i$ is adjacent to the point at which the cam is secured upon the shaft B. When the end of the lever $i$ is approaching said point, there will be a forward movement of the carriage Z, and when the lever is traveling on the side of the cam farthest from the shaft B there will be a rearward movement of the said carriage.

The belts for feeding the pickets to a position where they may be moved transversely across the machine and between the wires passing from the reels N are lettered $m$, and travel upon the pulleys $n$, and these pulleys are given a proper intermittent rotary motion from the shaft $h$, through the medium of the jointed arms $o$ and the spring-pawl $p$, which latter engages the ratchet-wheel $q$, rigidly affixed upon the rear axle supporting the pulleys $n$. The shaft $h$ receives its motion, as aforesaid, from the cam $k$, and communicates it through the said arms $o$ to the pawl $p$ and ratchet $q$.

Upon the rear portion of the feed-table is arranged in elevated bearings $t$ the transverse guide-rod $u$, upon which is arranged the traveling feed device $w$, which consists of a frame having apertures through which the rod $u$ passes, and to which frame is pivoted the dog $x$, the engaging end of which points toward the twister-disks X.

Upon the feed device $w$ are formed the ears $y$, in which is placed the inner end of the horizontal rod $z$, the other end of which rod carries a plate or nut, A', and between the nut A' and ears $y$ is arranged upon the rod $z$ the coiled spring B'. The inner end of the rod $z$ has an eye through which a cord, C', passes, and which forms an endless belt traveling over the pulleys D' E'. When, by the movement of the pulleys D' and E', the cord C' moves the feed device $w$ toward the outer edge of the table, as shown in Fig. 3, the pivoted dog $x$ will be depressed by its own specific gravity, and a picket will be fed by the movement of the belts $m$ in front of said dog. Then, upon the reversal of the movement of the pulleys D' and E' and the cord C', the feed device $w$ will be rapidly moved toward the disks X, whereby the dog $x$ will be caused to force the picket to the opposite side of the machine and between the wires passing from the tubes W. In Fig. 3 I show the feed-dog $x$ in contact with the end of a picket, the latter being in position to be forced from the belts $m$ to the opposite side of the machine.

The spring B' is advantageous in that it counteracts the effect of any rebound of the picket, and it also permits pickets of varying length to be fed across the machine without alteration in the movement of the cord C'. If, during the process of feeding the pickets across the machine it should happen that one picket longer than the rest should come in front of the feed-dog $x$, it would be fed across the machine, and when the end of the picket opposite to the device $w$ struck the said opposite side of the machine the spring B' would be compressed, whereby the movement of the cord C' would not be impeded. The extra length in the picket would be prevented from stopping the regular movement of the cord C', in view of the fact that the device $w$ would move on the rod $z$ a sufficient distance to compensate for the undue length of the picket. Upon the return of the feed device $w$ to the other side of the machine, as illustrated in Fig. 3, the expansive force of the spring B' will force the ears $y$ along on the rod $z$ to their former position. The movement allowed to the feed device $w$ on the rod $z$ is necessary, in view of the fact that the pickets often vary in length, and that the cord C' has a definite distance to move according to the throw of the rods H' and I'.

The pulleys D' and E' are operated by means of the rack F' and pinion G', the latter being mounted upon the axle which sustains the pulley D', and the rack F' receiving its movement from the cam $k$ through the rods H' I'. The rod H' receives an intermittent movement from the cam $k$ and imparts it to the rod I', which in turn gives the rack F' a reciprocating motion across the teeth of the pinion G', whereby the axle upon which it is mounted is given a rotary motion first in one direction and then in the other, and the pulley D', being secured thereon, receives a like movement and operates the cord C' and feeding device $w$ to feed the pickets between the wires, in the manner hereinbefore described.

The reel K', for receiving the completed fence in the customary manner from the carriage Z and the twister-disks X, is mounted upon a shaft, L', arranged in bearings at the forward end of the machine. In the present instance the reel K' is square in cross section, and has pivoted or hinged upon it the bars M', upon which are pivoted the blades N'. The reel K' has upon it the buttons $x''$, which serve to lock the ends of the strips $y''$ when the bars M' are thrown open, as indicated in Fig. 5. The strips $y''$ will be secured upon the bar M' at an angle, so that when the bar is open no difficulty will be experienced in turning the button $x''$ to fasten the said strip down, locking the bar in position. When the fence is being wound upon the reel K', its tension will keep the bars M' open, and when the movement of the shaft is reversed, as hereinafter mentioned, the tension of the fence will close the bars M' against the reel K', and permit the removal of the bundle of fence. Prior, however, to reversing the movement of the reel K' for the purpose of closing the bars M', the buttons $x''$ are turned to free the strips $y''$, and the blades N' are moved laterally under the bars M', so as not to form an obstruction to the removal of the fence.

Upon the outer end of the shaft L' is rigidly affixed the ratchet-wheel O', and in close relation to the wheel O' is loosely mounted the plate P', carrying the pawl Q', which engages the teeth of the ratchet O', said plate having also lugs R', through apertures in which passes the adjustable rod S', the upper end of which is connected with the forward end of the hinged rod T', the other end of said rod being in connection with the bearing T'''', secured upon the carriage Z. The forward end of the rod T' is connected by a rod, V', with the hinged rod W', to which is secured the bearing X' for the wheel Y', which travels upon the surface of the fence as it is wound upon the reel. A spring-pawl, $a'$, is provided to prevent any backward movement of the ratchet-wheel Q'.

When the carriage Z is moved forward in the operation of feeding the fence from the twister-disks X, it will give the rod T' a corresponding movement, and this in turn will force the upper end of the rod S' forward, whereby the plate P' is given a rotary movement, and at which time the pawl Q' engages the ratchet-wheel O', giving it a similar rotary movement and winding the fence upon the reel K'. Upon the movement of the carriage Z toward the rear the rod T' and rod S' are likewise moved toward the rear, and the pawl Q' slides over the ratchet O', whereby, by means of the pawl $a'$, there will be no movement of the reel O'. The rod S' moves freely in the lugs R', formed upon the plate P', and during the winding of the fence upon the reel K' the wheel Y' is gradually elevated by the roll of fence with the rod T' and rod S', the length of the rod S' permitting this movement for a given distance without affecting its relation to the plate P'.

A great advantage is gained in having the wheel Y' move upon the roll of fence wound upon the reel K'. It will be understood that should the rotation of the reel K' continue the same at all times it would, as the roll of fence continued to enlarge, have a tendency to draw the fence from the twisters more rapidly than when the rotation of the reel was commenced. This is in view of the fact that the fence is wound upon a surface gradually increasing in diameter. When, however, the wheel Y' is made use of, and is regulated in its elevation by the size of the roll of fence, the movement of the reel K' is regulated, the throw of the pawl Q' being caused to decrease in length as the rods S', V', and W' are elevated; hence it will be noted that the reel K' will rotate less rapidly as the size of the roll of fence increases.

The operation of the machine will be understood in part from the detailed description hereinbefore presented, in which the movements of the various elements are set forth. The pickets to be fed between the wires as they pass forward from the reels N are placed upon the belts $m$ and moved across the machine by the operation of the feeding device $w$, the moment when the picket is to be moved between the wires being when the disks X and the carriage Z are in their rearward position. After the picket has been forced between the wires the carriage Z and disks X are moved directly forward and then rearward again by means of the levers $d$, bar $e$, levers $f$ $g$ $i$, and cam $k$, in the manner hereinbefore described; and when the disks X have reached their rear position the shafts K, hubs S, tubes W, and disks X will at once rotate, thereby twisting the main portion of the wire between said picket and the disks, after which the said parts constituting the twisters cease to rotate, and another picket is immediately driven between the wires, whereupon the carriage Z and disks X move forward, as before, and then rearward, when the disks X, tubes W, hubs S, and axles K will again rotate and twist the wire in rear of the picket. This operation is continued until a fence of the desired length has been made. While the fence is being constructed the reel K', which is rotated from the carriage Z, winds it upon itself into a roll, and when the winding of the fence upon the reel has progressed but a few minutes the tension of the fence moving against the bars M' will open them to the position shown in Figs. 5 and 6. After the bars M' have been opened the attendant will turn the blades N' outward, permitting them to project between the pickets. After a sufficient length of the fence has been made the operation of the machine will cease, and the attendant will cause the blades N′ to turn inward against the side of the bars M′, after which the reel K′ will be given a slight reverse movement, so as to close the bars M′ against the body of the reel, and to permit thereby the ready removal of the roll of fence therefrom.

In the foregoing description of the machine which is the subject of this application it will be noted that the disks X move forward and then rearward again before the wire is twisted around the picket last driven before them. This I regard as an important feature, in that, upon the return of the disks X to their rear position, a given length of untwisted wire is left between them and the picket, for the purpose of securing the latter, and the twisting of the wire may be accomplished without at the same time drawing from the reels N, the principal tension on the wire being on that portion between the picket and disks. If the disks X were at their forward position when the shafts K commenced to rotate, there would be a great strain on the wire, and it would be liable to be broken, besides interfering with the rearward movement of the disks X and tubes W.

What I claim as my invention, and desire to secure by Letters Patent, is—

1. In a fence-making machine, the twisters, consisting of the axles K, having the hubs S, containing apertures T, disks X, and tubes W, carried by said disks, and having their rear portion within said apertures T, in combination with mechanism for giving the disks X and tubes W a horizontal longitudinal movement, whereby, when the picket has been inserted between the wires and the disks moved forward and then rearward again, a proper length of untwisted wire will be left between them and the picket for the purpose of securing it by subsequent twisting without drawing from the reels, substantially as set forth.

2. In a fence-making machine, the twisters, consisting of the shafts K, hubs S, disks X, and tubes W, in combination with the carriage Z, bell-crank levers d, bar e, levers f g, shaft h, lever i, and cam k, substantially as and for the purpose set forth.

3. In a fence-making machine, the traveling carriage Z, in combination with the rods T′ S′, plate P′, carrying a pawl, Q′, the ratchet O′, and reel K′, substantially as and for the purpose set forth.

4. In a fence-making machine, the reel K′, provided with the hinged bars M′ and blades N′, substantially as and for the purpose set forth.

5. In a fence-making machine, the traveling carriage Z, rod T′, rod S′, plate P′, pawl Q′, ratchet O′, and reel K′, in combination with the hinged rod W′ and wheel Y′, substantially as and for the purpose set forth.

6. In a fence-making machine, the feed device, consisting of the frame w, pawl x, ears y y, rod z, head A′, and spring B′, in combination with the guide u′ and traveling cord C′, connected with the said rod z, substantially as and for the purpose set forth.

7. In a fence-making machine, the feed device, consisting of the frame w, pawl x, ears y y, rod z, head A′, and spring B′, in combination with the guide-rod u′, cord C′, connected with rod z, pulleys D′ E′, rack F′, and pinion G′, substantially as set forth.

8. In a fence-making machine, the axles K, having hubs S, containing apertures, in combination with the disks X, tubes W, plate Y, traveling carriage Z, and pins a, substantially as and for the purpose set forth.

Signed at Quincy, in the county of Adams and State of Illinois, this 17th day of July, A. D. 1884.

JOSEPH ZENGEL.

Witnesses:
AUG. JACOBS,
B. H. JACOBS.